(12) United States Patent  (10) Patent No.: US 7,469,082 B1
Okorogu  (45) Date of Patent: Dec. 23, 2008

(54) HIGH POWER OPTICAL FIBER LASER ARRAY HOLOGRAPHIC COUPLERS

(75) Inventor: Albert O. Okorogu, Canyon Country, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 11/904,703

(22) Filed: Sep. 28, 2007

(51) Int. Cl.
 *G02B 6/34* (2006.01)
(52) U.S. Cl. .............................. 385/37; 385/15; 385/31
(58) Field of Classification Search .................. 385/15, 385/31, 37
 See application file for complete search history.

(56) References Cited

U.S. PATENT DOCUMENTS

| | | | |
|---|---|---|---|
| 4,586,780 A * | 5/1986 | Chern et al. | 359/294 |
| 6,243,515 B1 * | 6/2001 | Heflinger et al. | 385/37 |
| 6,673,497 B2 * | 1/2004 | Efimov et al. | 430/1 |
| 2008/0024789 A1 * | 1/2008 | Tobiason et al. | 356/521 |

* cited by examiner

*Primary Examiner*—Jennifer Doan
(74) *Attorney, Agent, or Firm*—Derrick Michael Reid

(57) ABSTRACT

A transmissive holographic optical element including a chirped grating is used to inject light by side firing laser light from a an array of laser diodes into an optical fiber with a reflective HOE reflecting the injected laser light through and along the optical fiber with the transmissive holographic optical element HOE and reflective HOE sandwiching a portion of an optical fiber for increased laser side firing pumping efficiency in optical fibers.

15 Claims, 3 Drawing Sheets

LASER ILLUMINATED SIDE FIRING HOE

LASER DIODE DIVERGENCE

GLASS HOE FIBER

THIN FILM HOE FIBER

POLYGONAL HOE FIBER

HOLOGRAPHIC OPTICAL ELEMENT
MANUFACTURING METHOD

US 7,469,082 B1

HIGH POWER OPTICAL FIBER LASER ARRAY HOLOGRAPHIC COUPLERS

REFERENCE TO RELATED APPLICATION

The present application is related to applicant's copending application entitled High Power Optical Fiber Laser Array Holographic Coupler Manufacturing Method, Ser. No. 11/906,021, filed Sep. 28, 2007, by the same inventor.

FIELD OF THE INVENTION

The invention relates to the field of optical couplers for optical fibers. More particularly, the present invention relates to optical couplers for coupling laser light into optical fibers.

BACKGROUND OF THE INVENTION

An array of high power laser light has been pumped into optical fibers for amplification along the optical fibers. Current approaches of injecting high power pump light into optical fibers include end-pumping, tapered fiber bundles, V-groove side pumping, embedded-mirror side pumping, geometrically multiplexed end-pumping, and a host of other systems. The complexities of these systems and devices required for laser pumping, geometrically grows with the pumping schemes employed and the amount of the required pumping power. While some of these approaches are not robust, others suffer from excessive costs. Still others suffer from alignment sensitivity, lack of compactness, scalability, and insufficient coupling efficiency, because of difficulty in coupling laser outputs into the fiber.

Some optical pumping approaches, such as the V-groove approach and the side-pumping approach, require the use of embedded micro-mirrors or mechanical etching in the inner fiber cladding that may weaken the fiber and pose a high risk to the mechanical integrity of the optical fiber. In addition, as the demand for power increases, the use of these laser-pumping approaches disadvantageously requires redesigning the fiber coupling structure to accommodate the higher power. Existing laser pumping coupling means are unsuitable for efficient pumping and coupling of laser light from an array of high power laser diodes into the optical fiber. These and other disadvantages are solved or reduced using the invention.

SUMMARY OF THE INVENTION

An object of the invention is to provide a coupler for coupling an array of high power laser light into an optical fiber.

Another object of the invention is to provide a coupler for coupling high power laser light into an optical fiber without mechanically altering the optical fiber.

Yet another object of the invention is to provide a holographic coupler for coupling high power laser light into an optical fiber.

Still another object of the invention is to provide a chirped grating holographic coupler for coupling high power laser light into an optical fiber.

A further object of the invention is to provide a method of manufacturing a holographic coupler for coupling high power laser light into an optical fiber.

The invention is directed to a holographic optical element (HOE) coupler for coupling laser light into an optical fiber. The HOE coupler preferably couples laser light from an array of laser diodes into the optical fiber for higher levels of light amplification. The optical fiber can be, for example, a double-clad Yb and co-doped Er—Yb optical fiber. The HOE coupler is preferably a Bragg grating holographic optical coupler. Using the HOE coupler, the optical fiber is not required to have mechanical etching of coupling structures or embedded micro-mirrors within the fiber cladding. The holographic optical element (HOE) coupler is robust and can be designed for any wavelength in the preferred range of 300 nm to 2.7 µm, depending on the limitation of the holographic material used.

In a first aspect of the invention, the preferred HOE coupler includes a top laser light transmitting HOE and a bottom laser light reflective HOE. The top transmitting HOE is preferably a side firing HOE. The bottom HOE is preferably a reflective HOE. A top and bottom stripped double-clad optical fiber is sandwiched between transmitting and reflecting HOEs. The HOEs can be fabricated in commercially available high-efficiency photosensitive holographic recording materials. In a second aspect of the invention, the HOE coupler can be precisely manufactured using a HOE manufacturing method where interference fringes are created using an array of stepped micro lenses for generating an array of beams interfered with by a referenced beam using a beam splitter.

The HOE coupler advantages include ease of light and mechanical coupling, high angular and spectral filtering selectivity, optical power concentration, lightweight, thin in the 15 µm range, low cost, high coupling efficiency, insensitivity to misalignment, and simplicity of direct coupling into fibers with minimum perturbation of fiber structure. The HOE coupler has the advantage of being a universal coupler for all types of inner cladding shapes, sizes, and designs.

The HOE coupler serves to couple light from a laser diode or an array of laser diodes into a fiber through a thin film or glass of optical hologram indexed in the HOE coupler disposed on the sides of the optical fiber. The HOE can be sized to provide a universal coupling scheme for various inner-fiber cladding shapes, sizes, and designs, which can easily be integrated into existing fiber-laser systems. The HOE couplers provide a non-mechanical coupling scheme that avoids the embedding of special micro-mirrors or mechanical etching in the fiber cladding that degrades or weakens the physical structure of the fiber. The HOE coupler is a cost-effective holographic coupler that is insensitive to misalignment of the laser diodes. The use of a non-mechanical robust HOE coupler offers high coupling efficiency of greater than 80% with a minimum perturbation of fiber structure, for high-power laser array applications. These and other advantages will become more apparent from the following detailed description of the preferred embodiment.

DETAILED DESCRIPTION OF THE PREFERRED EMBODIMENT

Figure 1:
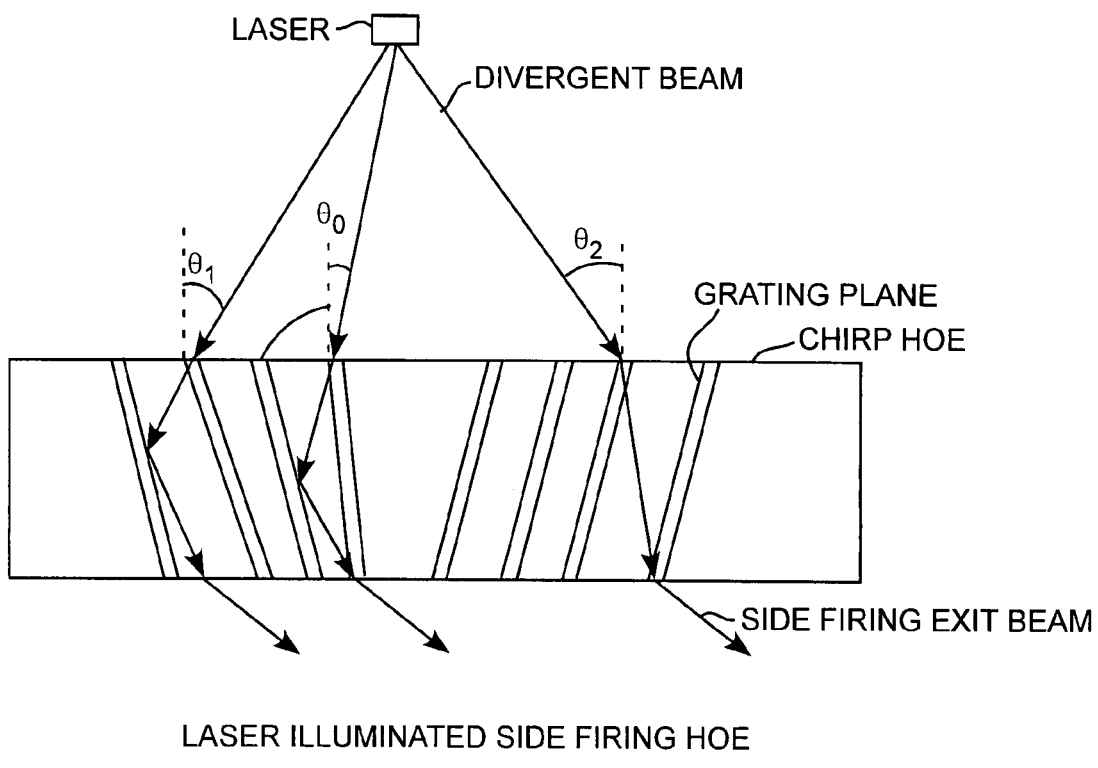
FIG. 1 is a diagram of a side firing holographic optical element (HOE) that is illuminated by a laser.
Figure 2:
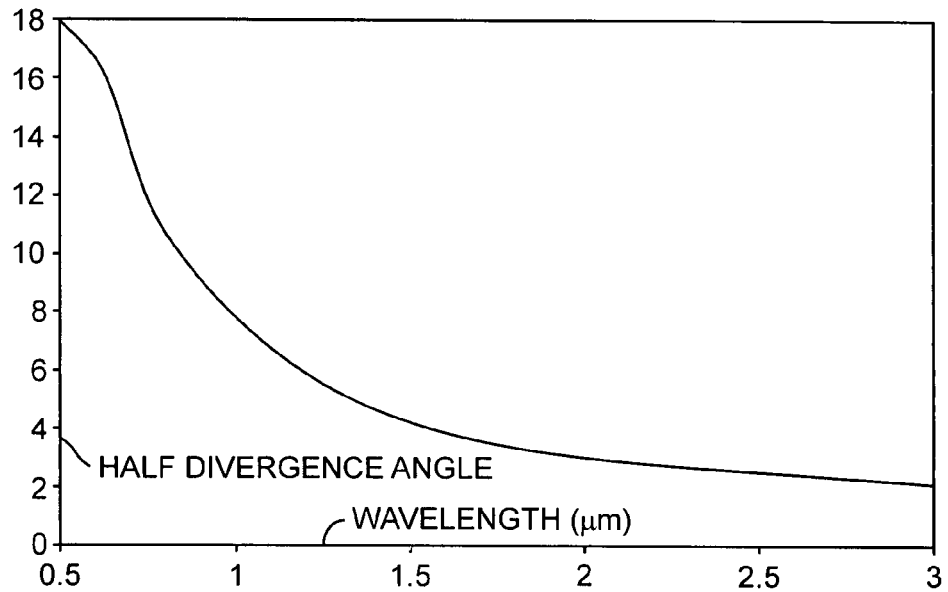
FIG. 2 is a plot of laser diode divergence.

An embodiment of the invention is described with reference to the figures using reference designations as shown in the figures. Referring to FIGS. 1 and 2, a laser that may be a laser diode generates a divergent beam for illuminating a holographic optical element (HOE) that is preferably a chirped HOE having variable grating planes. The divergent beam is angularly spread for example through divergent beams having respective angles $\theta 0$, $\theta 1$, and $\theta 2$ for refracting and reflecting the divergent beam through the HOE so that the divergent beams exit the HOE as respective side firing exit beams. The side firing exit beams are preferably collimated side-firing exit beams. Depending on the preferred exit direction, a collimating HOE may be required to re-direct the side firing exit beams. The selectivity of the grating planes and the maximum acceptable laser diode divergence angles θ for various laser diode wavelengths determines the amount of light coupled into the double-clad fiber through a chirped HOE coupler to determine the maximum diffraction efficiency.

The HOE grating is chirped to maximize light coupling from the laser diode, which has a spread in divergence angle. The chirped or non-uniform grating structure with grating spatial periods designated as Λi, is used for refracting the various divergent beams of the laser diode into a preferred direction. A plot of laser diode half-divergence angle versus readout wavelength limits the range of divergence of the beams and hence the chirped grating plane. A fringe plane will efficiently diffract any rays, whose angle corresponds to angle θi for which Λi was fabricated, for example the fringe plane Λ1, will efficiently diffract any rays with divergence angle, θ1. Thus, the grating planes that diffract the divergence angles θ1, θ2, and θ3 are separated by non-uniform spatial periods or distances Λ1, Λ2, and Λ3. In FIG. 1, a HOE coupler can provide maximum coupling efficiency for any source with divergence angles in the range between $θ_1$ and $θ_2$. Thus, for efficient coupling of laser diode, a volume HOE coupler with a chirped grating structure may be used. The HOE with a constant grating structure can be ineffective in coupling light from a source with a large divergence angle, due to angular selectivity of the HOE.

Figure 3:
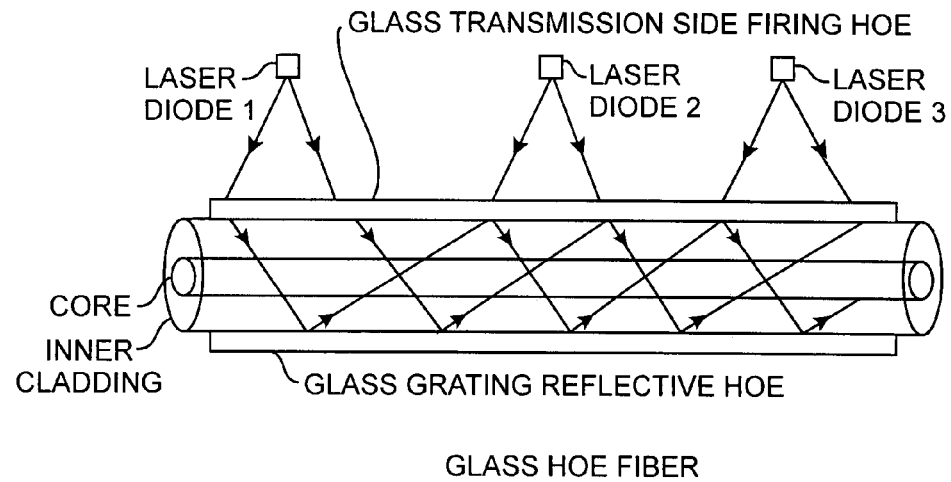
FIG. 3 is a diagram of a glass HOE fiber.

Referring to FIGS. 1, 2, and 3 and more particularly to FIG. 3, a glass transmission side firing HOE is illuminated by an array of laser diodes, such as laser diode 1, laser diode 2, and laser diode 3. The glass transmission side firing HOE is a transmissive side firing HOE that provides side firing laser light that enters into an optical fiber from the side. The glass grating reflective HOE is used to reflect the injected side firing laser light so that the laser light propagates along the optical fiber. The glass grating reflective HOE is a reflective HOE that cooperates with the transmissive side firing HOE. The transmissive HOE and the reflective HOE sandwich the optical fiber comprising a core and an inner cladding. The HOEs are thin glass holographic couplers that are disposed on to the exterior of the circular inner cladding of the optical fiber. The HOES include the transmission glass grating and the reflective glass grating between which is disposed the optical fiber. The transmissive HOE and the reflective HOE are glass chirped grating HOEs. The fiber core and the inner cladding of the optical fiber remain fixed together for inherent structural integrity.

The glass HOE coupler can essentially be fabricated either in thin holographic films or thin sheets of photo-thermorefractive glass. The thin photo-thermo-refractive Bragg HOE is used because the optical sensitivity of the HOE can extend the wavelengths of operation of the coupler to 2.7 μm with minimal aberration. The transmission glass grating refracts the divergent beams from the laser diode at the necessary critical angle of the optical fiber into the inner cladding. The reflective glass HOE is also a grating that also preferably reflects the injected laser light at the same critical angle to diffract all laser light including any remnant of the undiffracted zero order beam from the transmissive HOE. Ideally, the transmissive HOE will efficiently couple laser diode light with a small divergence angle. To accommodate laser diodes with large divergence angles, the reflective HOE is a grating glass HOE that is used to correct for lateral dispersion and couple the undiffracted light from the transmissive HOE back into the optical fiber.

Figure 4:
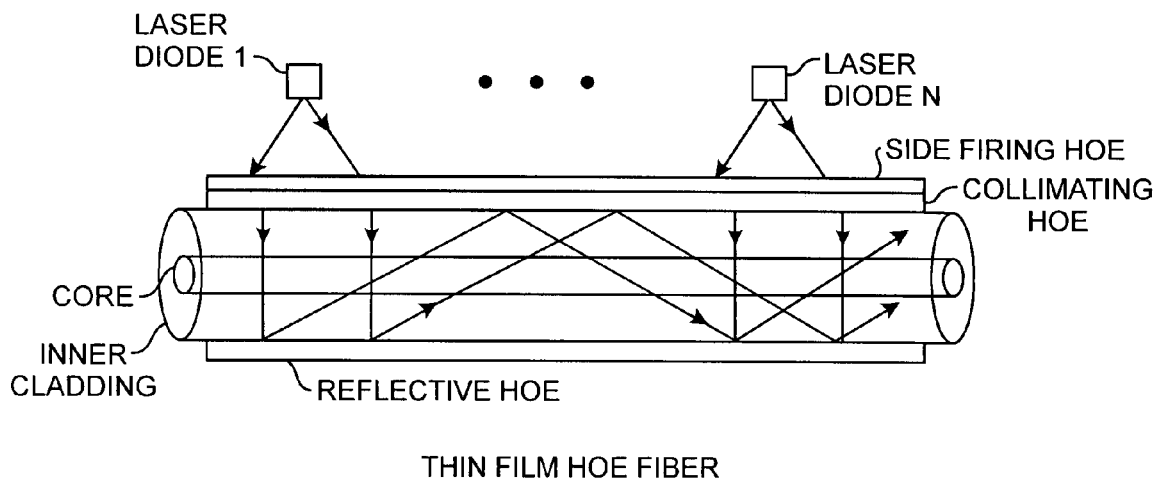
FIG. 4 is a diagram of a thin film HOE fiber.

Referring to FIGS. 1 through 4, and more particularly to FIG. 4, a thin film holographic Bragg grating HOE coupler is disposed about a circular inner cladding of an optical fiber. Light from any number of laser diodes, such as laser diode 1 through laser diode N can be coupled into the optical along the fiber length. A side firing HOE and a collimating HOE are juxtaposed in a cooperative arrangement for providing side firing collimated laser light injected into the optical fiber. The side firing HOE and the collimating HOE combine in function as a single collimating side firing HOE. The collimated injected laser light is reflected by a chirped reflective HOE, into the optical fiber, at the critical angle of the fiber. As such, the side firing HOE and the collimating HOE are transmissive HOES. In this preferred form, the injected laser light first transits radially through the fiber from the two transmissive HOES. The injected collimated light is then reflected along the length of the fiber. The two transmissive HOES and the reflective HOES are preferably thin film HOES.

For large divergence angles and direct light coupling, a thin film HOE coupler may be preferred. The thin film side firing HOE is designed such that the inscribed fringe pattern in the medium is non-constant being chirped to accommodate the large divergence angles from the laser diodes. The side firing HOE is a transmissive HOE having a chirped and an aberration corrected holographic optical element that collects light at a wide range of divergence angles from the array of laser diodes and transmits side firing beams to the second collimating HOE. The collimating HOE transmits the laser light through the optical fiber to the third optical element that is a reflective HOE. The reflective HOE reflects the laser light at the critical angle θc of the fiber. The reflective HOE reflects internally all of the light into the fiber inner cladding.

The HOE coupler minimally includes at least one transmissive HOE and at least one reflective HOE. These two HOEs are preferably both made of glass or thin films. The transmissive HOE and reflective HOE are disposed on the exterior of the inner cladding of an optical fiber to sandwich an optical fiber between the transmissive HOE and reflective HOE. The transmissive HOE injects laser light from an array of sources such as laser diodes into the optical fiber. The transmissive HOE can provide side fired injected laser light preferably using a single chirped grating glass side firing transmissive HOE or provide collimated injected laser light using a combination of a chirped grating transmissive HOE and a collimating transmissive HOE. The reflective HOE is a chirped grating reflective HOE that reflects the side firing injected laser light for reflecting uncollimated side fired laser light or the reflective HOE is a uniform grating for reflecting the collimated injected laser light. In either case, the reflective HOE serves to reflect injected laser light along the length of the optical fiber within the critical angle θc.

Figure 5:
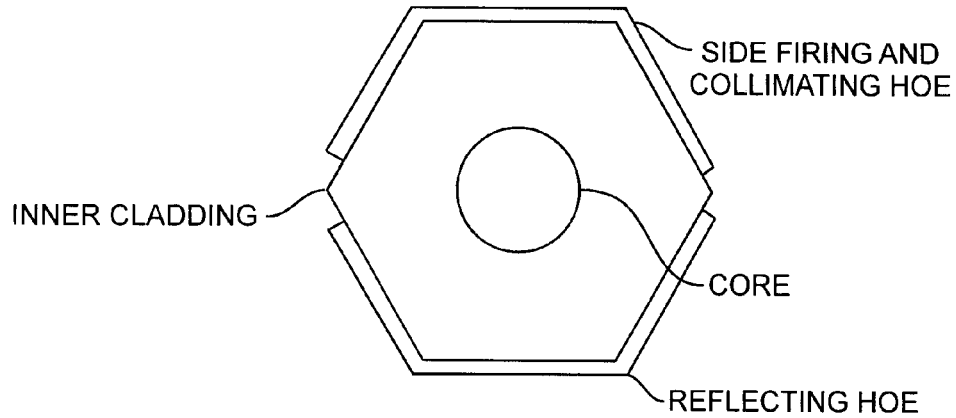
FIG. 5 is a side view of a polygonal HOE fiber.

Referring to FIGS. 1 through 5, and more particularly to FIG. 5, the combined side firing and collimating HOE, or simply the side firing HOE, and the reflective HOE can be adapted to any fiber cladding shape. In this Figure, the side firing HOE and the reflective HOE are disposed on opposing sides of a polygonal-shaped inner cladding of the optical fiber. The inner cladding surrounds a core of the optical fiber. The transmissive HOE and the reflective HOE are each preferably disposed on respective three outer surfaces and the polygonal inner cladding.

Figure 6:
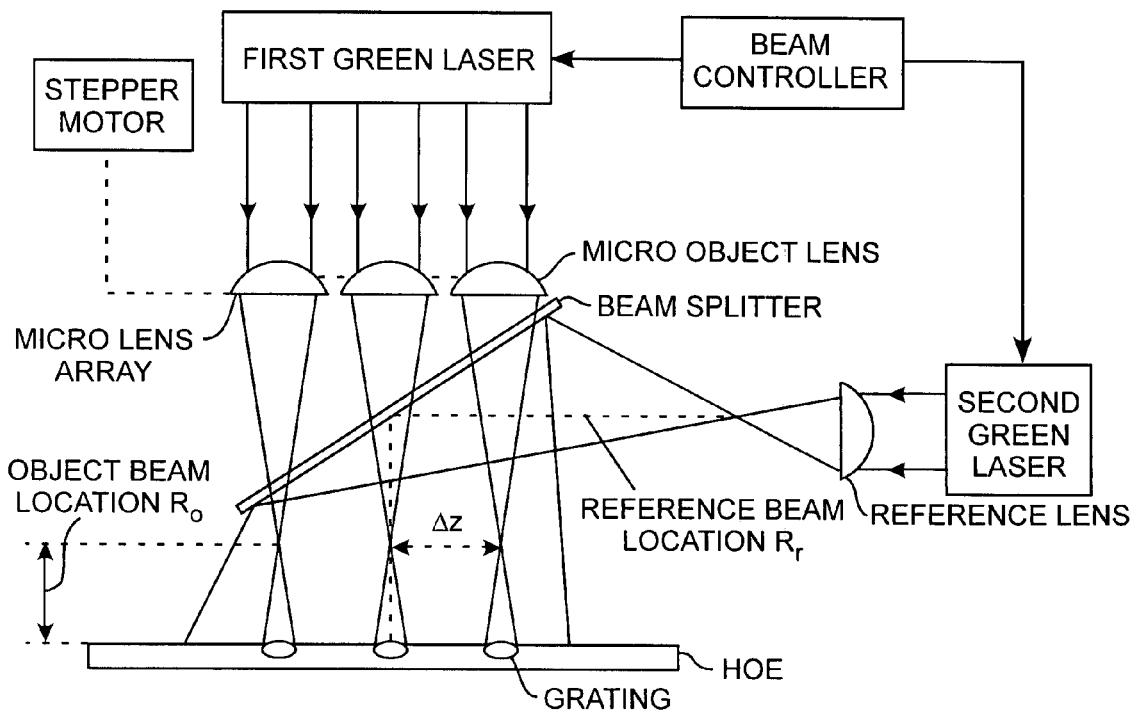
FIG. 6 is a block diagram depicting a holographic optical element manufacturing method.

Referring to all of the Figures and more particularly to FIG. 6, the grating of a HOE can be made using a holographic optical element manufacturing method. A beam controller controls the generation of coherent laser light from a first laser and a second laser. The first laser and second laser may be green color lasers. The first laser provides laser light to micro object lens that are arranged in a linear array and that can be stepped laterally by a stepper motor. The array of micro object lens includes lenses for providing respective convergent beams that diverge, emulating the divergence of an array of laser diodes that will eventually be coupled into the fiber. The second laser provides laser light to a reference lens for generating a reference beam at a relative location reference line Rr. The convergent beams and the reference beams illuminate a beam splitter for creating interference of the convergent beams focusing at an object beam location Ro. The focused convergent beams are separated by a distance Δz, which is the actual separation distance of the light from the laser diodes that will be coupled into the optical fiber. The HOE coupler manufacturing method is non-mechanical as there is no etching or weakening of the inner cladding or fiber core. The gratings are directly burned into the HOE using the focused convergent laser beams and the reference beam.

The principle of operation and applicability of a HOE coupler lies in creating accurate grating geometry recorded in the glass or thin film. The basic technique for recording the gratings in the HOE is to divide a coherent light beam from a recording laser into two equally polarized monochromatic waves of equal intensity, which is designated as the first laser and the second laser. These two waves could be planar, spherical or a combination of both. A standing wave forms in the region where the two waves intersect to create regions of dark and bright bands of interference fringes. A photosensitive or holographic material is placed in the region of intersection of the two waves and records the fringe patterns or planes of interferograms. The effect of the interference of the two waves in the HOE medium is to create a perturbation in the refractive index of the volume of the HOE or to change the surface profile of the photosensitive medium. The created fringe planes are similar to gratings with periodically scattering planes when illuminated with a light beam.

However, the laser diode array wavelengths and the wavelength used in manufacturing the HOE are different in most cases. Such HOE made from recording geometries that are different from the readout or application geometry will limit the operational wavelengths and pose additional problems. Aberration can be produced because of wavelength shift and low optical diffraction efficiency with a low signal-to-noise ratio because of the inability to completely fulfill the Bragg condition. The Bragg condition indicates that the best results are obtained when the recording conditions are exactly the same as the applications or read-out conditions. For example, for best results, a HOE recorded with a particular wavelength, should be used for the same wavelength for which it was recorded. Using the HOE for a different wavelength will cause a shift in wavelength, which causes both longitudinal chromatic dispersion and geometrical aberrations. While the geometrical aberrations can be compensated by a recursive design process, which extends the wavelength of operation to 2 μm, the lateral dispersion is eliminated by the use of narrowband reflection HOEs.

To achieve high diffraction efficiency vis-à-vis the coupling efficiency, in the HOE coupler for wavelengths other than the recording wavelengths, the side firing and collimated HOE transmission are used to correct for chromatic aberrations and dispersion when the HOE readout illumination wavelength is different from the recording illumination wavelength. The chirped transmissive HOE corrects for the aberrations while the collimating HOE transmits a field corrected collimated beam. The reflective HOE then eliminates the lateral dispersion, couples the light transmitted by the collimating HOE at the critical angle θc into the inner cladding of an optical fiber portion.

The transmissive chirped HOE plays a significant role in the laser light coupling. The transmissive chirped HOE corrects for aberrations and is the element that determines whether laser light from a laser diode is coupled into the optical fiber. For efficient light coupling of laser light from the laser diodes, the fringe patterns inscribed in transmissive chirped HOE volume determines whether a laser light source with varying divergence angles can be effectively coupled into the optical fiber. The inscribed numerical aperture (NA) of the grating planes of the transmissive chirped HOE coupler must accommodate the divergence angles $\theta_{Bi}$ of the marginal rays from the laser diodes. Thus, NA=$\sin \theta_{Bi}$=$\lambda/2n\Lambda_i$, where $\Lambda_i$ is the grating period given by $\Lambda_i$=$2n \sin \theta_i$, in which $\lambda_o$ is the recording wavelength and $\theta_i$ is the half-angle between the incident rays of the recording beams, Ro is the object, and Rr are the reference beams in the medium. The index i is the location of the fringe plane. During the recording of the HOE, each ray in the $R_o$ and $R_r$ beams arrives at particular divergent angles on the holographic film plate. These divergent angles correspond to $\theta_1$ and $\theta_2$ inside the holographic medium. The intersection of these rays within the volume of the HOE medium creates the holographic grating planes of spatial periods $\Lambda_i$. The period of the planes $\Lambda_i$ created within the HOE medium varies because of the spread in angle of arrival of the divergent beam rays on the holographic film plate. The angle of arrival provides for a total fringe structure with an ensemble of varying fringes, which corresponds to an ensemble of varying ray angles of a divergent beam. The varying fringe structure is a chirped grating with a spatial frequency f as defined by $1/\Lambda$. This spatial frequency variation enables the HOE to accommodate a source with varying divergence angles.

During operation with an illuminating beam $\lambda_c$, the transmissive chirped HOE coupler obeys the Bragg condition of $2n\Lambda_i \cos(\phi-\theta_{Bi})$=$M\lambda_c$, where n is the refractive index of the HOE medium, $\phi$ is the inclination angle of the Bragg plane. The term $\Lambda_i$ is the ensemble of the fringe periods of the inscribed Bragg planes in the HOE medium, and $\theta_{Bi}$ is the range of incident angle or divergence of the readout beam. In this grating configuration, because of the non-constant fringe period, the grating inclination angle $\phi$ also varies. When $\phi$=$\pi/2$, the grating plane is normal to the HOE surface, and the Bragg condition reduces to $2n\Lambda \sin \theta_B$=$M\lambda_c$. The inclination angle varies from $\phi$=$\pi/2$, at the center of the HOE to $\phi$=$\theta_B$+$\cos^{-1}(\lambda/2n\Lambda)$ at the edge of the plate. A slanted Bragg grating plane is defined as one where $\phi \neq \pi/2$. A plurality of slanted Bragg grating planes define the chirped grating.

To package the HOE coupler, a portion of the fiber outer cladding is stripped to expose the inner cladding. The transmitting and reflecting HOES are either laminated for the case of thin holographic film or indexed with an index-matching adhesive for disposing the thin photo-thermo-refractive glass onto the stripped portion of the inner cladding. The fiber and HOE coupler can be mounted on any support or embedded in wafers for more rigid support. An array of laser diodes can now be mounted along the HOE-fiber length and on the side of the transmissive chirped HOE.

The HOE couplers are well suited for high-power laser array fiber communications such as for active remote sensing, high bandwidth free space laser communications, ground-to-space communications, or inter-satellite communications. The use of HOE couplers for coupling laser light into fiber lasers is commercially viable because fiber integrity is maintained. The laser light is directly injected into the inner cladding and core through a thin laminated or indexed hybrid HOE that may be 15 μm thick. The HOE is insensitive to laser diode misalignment because of holographic principles enabling a large number of laser diodes to be placed along the entire length of the HOE coupler to inject laser light into the fiber. This ease of laser light coupling enables power scaling to pump-power in the kW range into the optical fibers. The HOE coupler is amenable to all types of inner cladding shapes, sizes and designs, and can be integrated into existing fiber-laser system with ease. In addition, being a Bragg grating, the diffraction efficiency can be high, which will lead to a high coupling efficiency. The thin film HOE coupler has an added advantage and flexibility in that it can be laminated on to any inner fiber cladding of any size, shape, or design without loss in its diffraction efficiency.

The transmissive chirped grating HOE is an aberration compensated volume holographic optical element that includes a chirped grating structure to couple light from an array of laser diodes into the inner fiber cladding of a double-clad amplifier fiber. The HOE can be fabricated in any of the commercially available high-efficiency photo-sensitive holographic recording materials such as photopolymers, photo-thermo-plastics, silver halide photographic emulsions, dichromated gelatin, polymers, and thin photo-thermo-refractive glass. The HOE can be used in various applications including solar energy generation, LADAR/LIDAR, three-dimensional displays, spectrometers, sensing in hazardous and high temperature environments, active remote sensing, and high bandwidth free space optical communications. Those skilled in the art can make enhancements, improvements, and modifications to the invention, and these enhancements, improvements, and modifications may nonetheless fall within the spirit and scope of the following claims.

What is claimed is:

1. A coupler for coupling laser light having a divergent beam into an optical fiber,
   the coupler comprising,
      a transmissive element having transmissive gratings for refracting the divergent beam into injected light through the side of the optical fiber and into the optical fiber,
      an optical fiber portion for the optical fiber, and the injected light passing through the optical fiber portion, the optical fiber portion comprising an inner cladding, and
      a reflective element having reflective gratings for reflecting the injected light along the optical fiber, the transmissive element and the reflective element are made of a thin film and disposed upon and made integral with the inner cladding of the optical fiber portion.

2. The coupler of claim 1 wherein,
   the transmissive gratings are chirped gratings, and
   the reflective gratings are chirped gratings.

3. The coupler of claim 1 wherein,
   the transmissive element comprises a chirped grating transmissive element and a collimating transmissive element, and
   the reflective element having uniform reflective gratings.

4. The coupler of claim 1 wherein,
   the laser light is generated from an array of laser light sources.

5. The coupler of claim 1 wherein,
   the laser light is generated from an array of laser diodes.

6. The coupler of claim 1 wherein,
   the transmissive element and the reflective element are made of glass.

7. The coupler of claim 1 wherein,
   the transmissive element and the reflective element are made of a thin film disposed upon the optical fiber portion have a hexagonal cross section.

8. A coupler for coupling laser light having a divergent beam into an optical fiber,
   the coupler comprising,
      a transmissive element having transmissive gratings for refracting the divergent beam into injected light fired through the side of the optical fiber and into the optical fiber, the transmissive grating is a variable chirped grating,
      an optical fiber portion for the optical fiber, and the injected light passing through the optical fiber portion, and
      a reflective element having reflective gratings for reflecting the injected light along the optical fiber.

9. The coupler of claim 8 wherein,
   the reflective gratings are uniformly parallel and spaced gratings.

10. The coupler of claim 8 wherein,
    the reflective gratings are variable chirped gratings.

11. The coupler of claim 8 further comprising, an array of laser diodes for generating the laser light.

12. A coupler for coupling laser light having a divergent beam into an optical fiber,
    the coupler comprising,
       a transmissive element having transmissive gratings for refracting the divergent beam into side fired light, the grating is a variable grating for collecting the divergent beam into the side fired light,
       a collimating element for collimating the side fired light into collimated light, the collimated light being injected light and fired through the side of the optical fiber and into the optical fiber,
       an optical fiber portion for the optical fiber, and the injected light passing through the optical fiber portion, and
       a reflective element having reflective gratings for reflecting the injected light along the optical fiber.

13. The coupler of claim 11 wherein,
    the reflective gratings are uniformly parallel and spaced gratings.

14. The coupler of claim 12 wherein,
    the reflective gratings are variable chirped gratings.

15. The coupler of claim 8 further comprising, an array of laser diodes for generating the laser light.

* * * * *